(12) United States Patent
Tang et al.

(10) Patent No.: US 11,895,547 B2
(45) Date of Patent: Feb. 6, 2024

(54) NETWORK CONTROLLED SMALL GAP CONFIGURATION

(71) Applicant: APPLE INC., Cupertino, CA (US)

(72) Inventors: Yang Tang, San Jose, CA (US); Candy Yiu, Portland, OR (US); Rui Huang, Beijing (CN); Jie Cui, Santa Clara, CA (US); Shuang Tian, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 616 days.

(21) Appl. No.: 16/476,381

(22) PCT Filed: Feb. 2, 2018

(86) PCT No.: PCT/US2018/016719
§ 371 (c)(1),
(2) Date: Jul. 8, 2019

(87) PCT Pub. No.: WO2018/144927
PCT Pub. Date: Aug. 9, 2018

(65) Prior Publication Data
US 2021/0410024 A1    Dec. 30, 2021

Related U.S. Application Data

(60) Provisional application No. 62/454,571, filed on Feb. 3, 2017.

(51) Int. Cl.
*H04W 36/00* (2009.01)
(52) U.S. Cl.
CPC ............... *H04W 36/0088* (2013.01)

(58) Field of Classification Search
USPC ....................................................... 370/252
See application file for complete search history.

(56) References Cited

U.S. PATENT DOCUMENTS

2011/0080962 A1* 4/2011 Blankenship ....... H04L 27/0006
                                                          375/259
2011/0199908 A1   8/2011 Dalsgaard et al.
(Continued)

FOREIGN PATENT DOCUMENTS

WO    2016/164782 A1    10/2016
WO    2016/182526 A1    11/2016
(Continued)

OTHER PUBLICATIONS

International Search Report and Written Opinion received for International Application No. PCT/US2018/016719, dated Apr. 26, 2018, 14 pages.
(Continued)

*Primary Examiner* — Gregory B Sefcheck
*Assistant Examiner* — Majid Esmaeilian
(74) *Attorney, Agent, or Firm* — Fay Kaplun & Marcin, LLP

(57) ABSTRACT

An apparatus of an evolved NodeB (eNB) comprises one or more baseband processors to encode measurement gap configuration information including a measurement gap configuration information element MeasGapConfig to configure a network controlled small gap (NCSG) pattern for a user equipment (UE) device if the UE requires an NCSG and the UE is not configured with a primary secondary cell (PS-CELL), and a memory to store the measurement gap configuration information.

15 Claims, 7 Drawing Sheets

(56) References Cited

U.S. PATENT DOCUMENTS

| | | | |
|---|---|---|---|
| 2012/0178465 A1 | 7/2012 | Lin et al. | |
| 2014/0341192 A1* | 11/2014 | Venkob | H04L 1/00 |
| | | | 370/336 |
| 2016/0219453 A1* | 7/2016 | Harada | H04L 5/001 |
| 2018/0084447 A1* | 3/2018 | Seo | H04L 1/00 |
| 2018/0084448 A1* | 3/2018 | Yang | H04L 5/003 |
| 2018/0098253 A1* | 4/2018 | Huang | H04W 36/0088 |
| 2018/0132258 A1* | 5/2018 | Andou | H04W 72/1257 |
| 2018/0324619 A1* | 11/2018 | Harada | H04W 24/10 |
| 2019/0229868 A1* | 7/2019 | Siomina | H04W 24/10 |
| 2021/0360729 A1* | 11/2021 | Yiu | H04W 76/27 |

FOREIGN PATENT DOCUMENTS

| | | |
|---|---|---|
| WO | 2017/138985 A1 | 8/2017 |
| WO | 2018/144927 A1 | 8/2018 |

OTHER PUBLICATIONS

Intel Corporation, "Signaling Support for Shorter Measurement Gap," Nov. 5, 2016, 3GPP, Sophia-Antipolis Cedex, FR.

Intel Corporation, "On per Rx Based Measurement Gap Configuration and Signaling," May 13, 2016, 3GPP, Nanjing, CN.

Intel Corporation, "NCSF Configuration" Jun. 5, 2017, 3GPP, Sophia-Antipolis Cedex, FR.

"3rd Generation Partnership Project; Technical Specification Group Radio Access Network; Evolved Universal Terrestrial Radio Access (E-UTRA); requirements for Support of Radio Resource Management," Technical Specification, Jan. 18, 2018, pp. 78-663, 3GPP, Sophia-Antipolis Cedex, FR.

* cited by examiner

NETWORK CONTROLLED SMALL GAP CONFIGURATION

CROSS-REFERENCE TO RELATED APPLICATIONS

The present application is the National Stage filing of International Application No. PCT/US2018/016719 filed Feb. 2, 2018, entitled NETWORK CONTROLLED SMALL GAP CONFIGURATION, which claims the benefit of U.S. Provisional Application No. 62/454,571 (P114780Z) filed Feb. 3, 2017. Said Application No. PCT/US2018/016719 and said Application No. 62/454,571 are hereby incorporated herein by reference in their entireties.

BACKGROUND

In the Third Generation Partnership Project (3GPP) Radio Access Network (RAN) Working Group (WG) 4, also known as RAN4, the concept of a network controlled small gap (NCSG) is being introduced. The NCSG may be configured differently on different component carriers (cc) but work on this is ongoing. A mechanism to define rules to configure NCSG for carrier aggregation (CA) and dual connectivity (DC) should be considered.

DESCRIPTION OF THE DRAWING FIGURES

Claimed subject matter is particularly pointed out and distinctly claimed in the concluding portion of the specification. However, such subject matter may be understood by reference to the following detailed description when read with the accompanying drawings in which:

Figure 1:
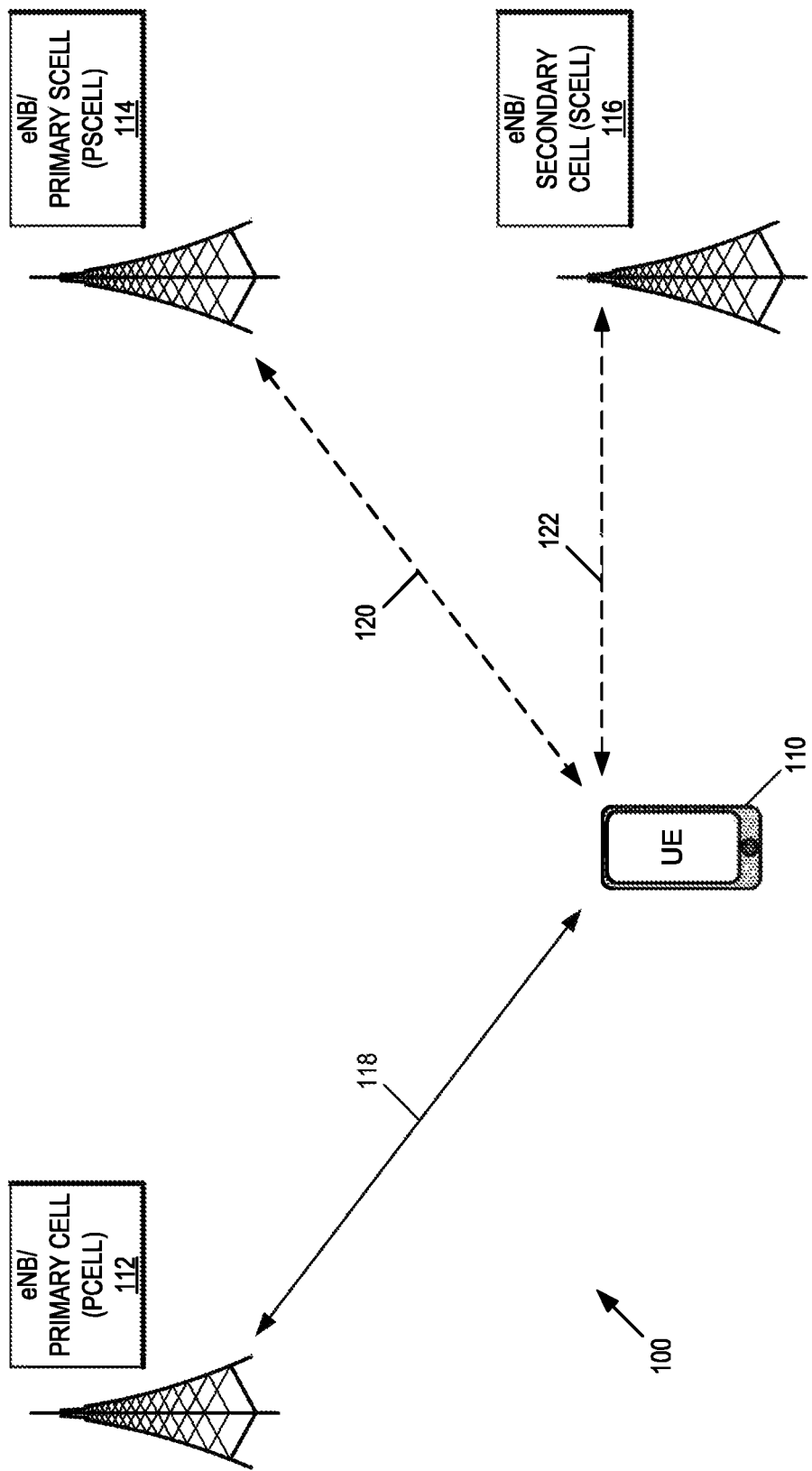
FIG. 1 is a diagram of a network having a user equipment capable of measuring signal levels on one or more frequencies in designated measurement gaps in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

Referring now to FIG. 1, a diagram of a network having a user equipment capable of measuring signal levels on one or more frequencies in designated measurement gaps in accordance with one or more embodiments will be discussed. As shown in FIG. 1, network 100 may comprise a wireless wide area network (WWAN) operating in accordance with a Third Generation Partnership Project (3GPP) standard such as a Long-Term Evolution (LTE) standard, an LTE-Advanced (LTE-A) standard, or a Fifth Generation (5G) New Radio (NR) standards, although the scope of the claimed subject matter is not limited in this respect. In network 100, the UE 110 may be communicatively coupled via radio link 118 with a serving cell embodied as an enhanced NodeB (eNB) 112 which may also function as a primary cell (PCELL) in some scenarios such as dual connectivity (DC).

In one or more embodiments, during measurement gaps designated by eNB 112, the UE 110 will measure downlink (DL) frequency or frequencies of one or neighbor or target cells deployed on neighbor eNB 114 via radio link 120 which may function as a primary secondary cell (PSCELL) in some scenarios. In addition, there may be one or more secondary cells such as secondary cell (SCELL) or eNB 116 on which UE 110 may obtain DL measurements via radio link 122 during a designated measurement gap period. During the measurement gap period, UE 110 may measure RSRP and then provide a measurement report to the eNB1 112. Such measurement gaps configurations may be specified and signaled via dedicated signaling for the UE 110 such that no downlink or uplink scheduling between the UE 110 and the serving cell 112 occurs to allow the UE to perform measurements on the one or more given frequencies. In some embodiments, the neighbor cell or eNB 114 may comprise a small cell or remote radio head (RRH) coupled to the eNB1 112 of the serving cell. In such embodiments, the neighbor cell or eNB 114 may comprise a micro cell, a pico cell, a femto cell, and so on. In other embodiments, neighbor cell or eNB 114 may comprise or otherwise be connected with a different eNB than the serving cell or eNB 112. The measurement results obtained by the UE 110 for the one or more neighbors cells 114 allow the eNB1 to determine whether to handover the UE 110 to a new cell or eNB, for example if the signal levels with a neighboring cell are better than the signal levels for the serving cell 112.

The measurement gap configuration is provided by the network 100 to the UE 110 via the serving cell or eNB 112. In accordance with one or more embodiments, the UE 110 may indicate to the network 100 the radio-frequency (RF) capability and the band capability of the UE 110 so that the network 110 can configure cell-group specific measurement for carrier aggregation (CA) or dual connectivity (DC) to reduce measurement delay and/or increase the downlink date rate if the UE 110 has two or more RF chains and is capable of operating on multiple frequency bands for the two or more RF chains. In some embodiments, if the UE 110 requires a network controlled small gap (NCSG) to prevent interruption during measurements, and the UE 110 is not configured with a PSCELL, for example with CA, the network 100 may provide a first NCSG configuration to UE 110. In other embodiments, if the UE 110 requires an NCSG to prevent interruption during measurements, and the UE 110 is supporting DC and is configured with a PSCELL, the network 100 may provide a second NCSG configuration to UE 110. The NCSG configuration patterns are discussed in more detail with respect to FIG. 4 and FIG. 5, below. An example of a UE 110 having multiple RF chains operating on multiple frequency bands is shown in and described with respect to FIG. 2, below.

Figure 2:
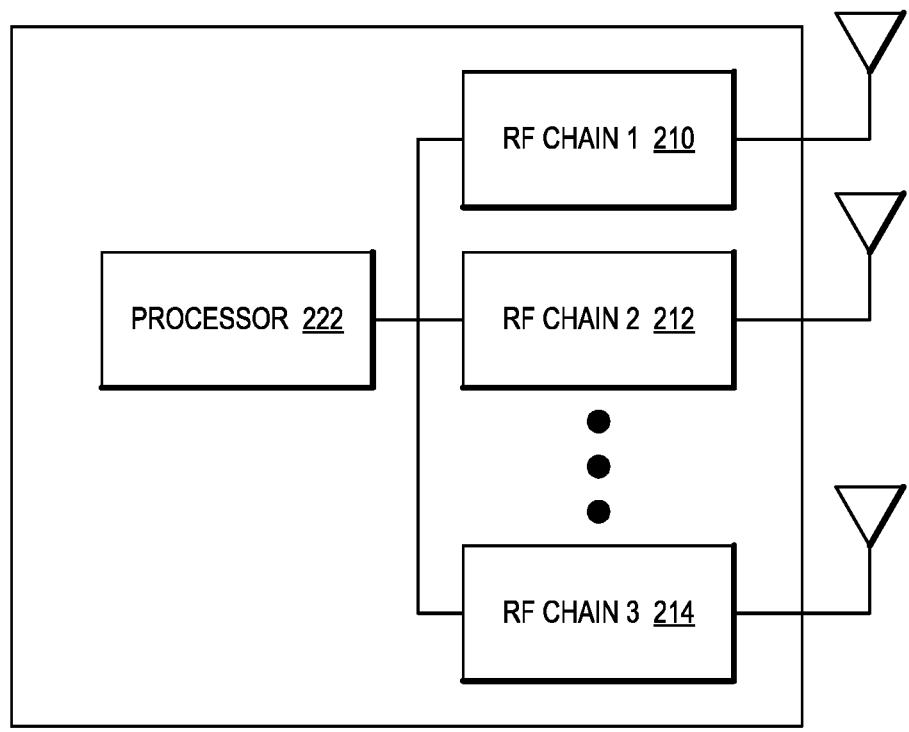
FIG. 2 is a diagram of a user equipment having multiple radio-frequency (RF) chains in accordance with one or more embodiments.

Referring now to FIG. 2, a diagram of a user equipment having multiple radio-frequency (RF) chains in accordance with one or more embodiments will be discussed. As shown in FIG. 2, the UE 110 may include multiple radio-frequency (RF) chains such as RF chain 1 (RF CHAIN 1) 210, RF chain 2 (RF CHAIN 2) 212, up to an Nth RF chain (RF CHAIN N) 214. The RF chains may be coupled to multiple antennas such as antenna 216, antenna 218, and antenna 220, respectively, and the RF chains may be controlled by a processor 222. In one more embodiments, one or more of the RF chains may be capable of operating on one or more frequency bands to transmit and/or receive data in the uplink and/or the downlink. An example of the RF chains having multiple frequency bands is shown in and described with respect to FIG. 3, below.

Figure 3:
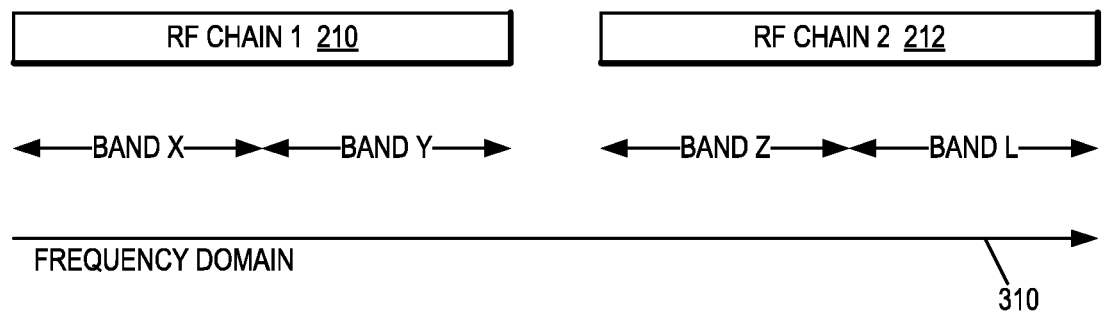
FIG. 3 is a diagram of an RF structure for the user equipment of FIG. 2 in accordance with one or more embodiments.

Referring now to FIG. 3, a diagram of an RF structure for the user equipment of FIG. 2 in accordance with one or more embodiments will be discussed. FIG. 3 shows an example of the radio-frequency (RF) structure for the UE 110. It should be noted that the RF arrangement shown in FIG. 3 is merely one example, and the UE 110 may have various other arrangements of RF chains and frequency bands, and the scope of the claimed subject matter is not limited in these respects. In the example shown in FIG. 3, the UE 110 may have two RF chains, RF chain 1 (RF CHAIN 1) 210 and RF chain 1 (RF CHAIN 2) 212. RF chain 1 may be capable of supporting band X and band Y. RF chain 2 may be capable of supporting band Z and band L.

In this example, since the UE 110 has more than one RF chain, the UE 110 is capable of using both RF chains for gap measurements to reduce measurement delay and/or to increase spectrum efficiency. Under current specifications the network 100 is not able to utilize the multiple RF chains implemented at the UE 100 due to lack of this kind of information. Therefore, in order to achieve different and resource-efficient measurement patterns for carrier aggregation (CA), for dual connectivity (DC), or for other features or other gaps, in one or more embodiments the network 100 receives indication from the UE 100 about the RF capability of the UE 110. Several embodiments for the UE 110 to indicate to the network 100 the RF capability are discussed herein.

In a first embodiment, the UE 110 may indicate to the network 110 whether it supports carrier aggregation specific measurement gap capability. Such an indication may be made by the UE 110 via the UE-EUTRA-Capability information element (IE) to convey the EUTRA UE Radio Access Capability Parameters, and the Feature Group Indicators for mandatory features to the network 100. The UE-EUTRA-Capability IE may be transferred to network 100 via Evolved Universal Mobile Telecommunications System (UMTS) Terrestrial Radio Access (EUTRA) or via another radio access technology (RAT). In furtherance of using a network controlled small gap (NCSG), the UE 110 may indicate is measurement gap capability to the network 110, and the network 100 may configure the UE 110 to utilize a selected NCSG pattern as shown in and described with respect to FIG. 4 and FIG. 5 below.

Figure 4:
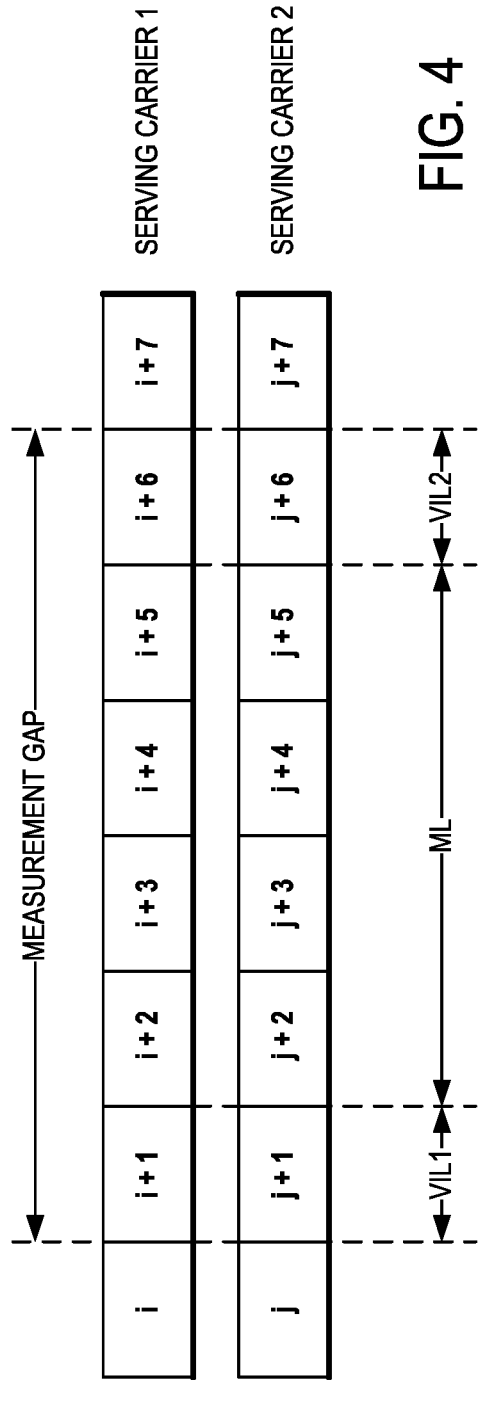
FIG. 4 is a diagram of a measurement gap and network controlled small gap (NCSG) in accordance with one or more embodiments.
Figure 5:
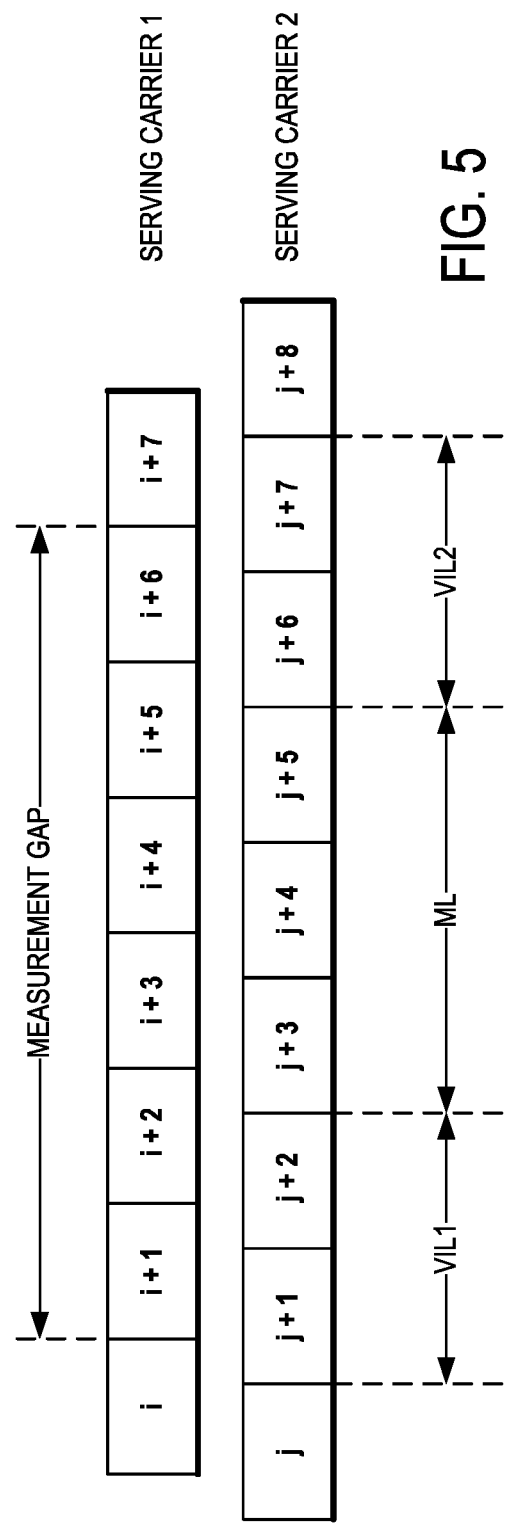
FIG. 5 is a diagram of a measurement gap and network controlled small gap for dual connectivity in accordance with one or more embodiments.

Referring now to FIG. 4 and FIG. 5, diagrams of a measurement gap and network controlled small gap (NCSG) in accordance with one or more embodiments will be discussed. FIG. 4 and FIG. 5 illustrate how different NCSG patterns may be configured depending on whether carrier aggregation (CA) or dual connectivity (DC) is deployed. Furthermore, different NCSG patterns may be configured depending on a per-component carrier measurement gap configuration or a per UE measurement gap configuration. In addition, rules may be defined where no NCSG is to be configured.

In one or more embodiments, the NCSG may be configured as specified in 3GPP Technical Specification (TS) 36.133 V14.0.0 (2017 June), the details of which are as follows. The UE 110 may reconfigure its receiver bandwidth, carrier frequency, and/or may turn on or off one of the RF chains such as RF chain 210 (RF Chain 1), RF chain 212 (RF Chain 2), or RF chain 214 (RF Chain 3), and so on, when performing measurements for example on a primary cell (PCell) or eNB 112, and activated secondary cell (SCell) or eNB 116, or an activated primary secondary cell (PSCell) or eNB 114, a deactivated SCell, and/or an unused RF chain. This may cause interruptions on a PCell or on one or more activated SCells, or both. If UE 110 requires network controlled small gap (NCSG) to prevent such interruptions and UE 110 is not configured with asynchronous dual connectivity (DC), then the following NCSG configurations may be made by the network. When UE 110 is not configured with measurement gap, the Evolved Universal Terrestrial Radio Access Network (E-UTRAN) explicitly may provide a single NCSG pattern with constant repetition period per UE. It should be noted that the Gap Pattern identifiers (ID) for the measurement gap are shown in Table 2, below, and the NCSG Gap Pattern IDs for the NCSG are shown in Table 1, below. When UE 110 is configured with Gap Pattern ID #0, for example per Table 2 below, on some of, but not all, serving carriers including the primary component carrier (PCC) and one or more secondary component carriers (SCCs), a single NCSG pattern with NCSG Pattern ID #0, for example per Table 1 below, may be implicitly configured on one or more of the serving carriers where measurement gap is not configured. Table 1 is shown, below.

TABLE 1

| | NCSG Configurations supported by the UE | | | | |
|---|---|---|---|---|---|
| NCSG Pattern Id | Visible interruption length before measurement (VIL1, ms) | Measurement Length during which there is no gap (ML, ms) | Visible interruption length after measurement (VIL2, ms) | Visible interruption Repetition Period (VIRP, ms) | Purpose |
| 0 | 1 | 4 | DL: 1 UL: 2 | 40 | Interruption control according to requirements in sections x, y, x |

TABLE 1-continued

NCSG Configurations supported by the UE

| NCSG Pattern Id | Visible interruption length before measurement (VIL1, ms) | Measurement Length during which there is no gap (ML, ms) | Visible interruption length after measurement (VIL2, ms) | Visible interruption Repetition Period (VIRP, ms) | Purpose |
|---|---|---|---|---|---|
| 1 | 1 | 4 | DL: 1 UL: 2 | 80 | Interruption control according to requirements in sections x, y, x |
| 2 | 2 | 3 | 2 | 40 | Interruption control according to requirements in sections x, y, x |
| 3 | 2 | 3 | 2 | 80 | Interruption control according to requirements in sections x, y, x |

As shown in FIG. 4, subframes of Serving Carrier 1 from subframe number i+1 to subframe number i+6 may be used as measurement gap. The NCSG may be implicitly configured on other serving carrier subframes of Serving Carrier 2 from subframe number j+1 to subframe number j+6. where no measurement gap is configured, with a visible interruption length VIL1 before the measurement length ML during which there is no gap, and a visible interruption length VIL2 after the measurement length ML. In NCSG configurations, during the VIL1 period and the VIL2 period, the UE 110 is not expected to transmit or receive any data. During the ML period, the UE 110 is expected to transmit and/or receive data on the corresponding serving carrier. Such an NSCG pattern may be defined per Table 1 based on the configured NCSG Pattern ID. When UE 110 is configured with Gap Pattern ID #1 on some of, but not all, the serving carriers including PCC and one or more SCCs, a single NCSG pattern with NCSG Pattern ID #1 per Table 1 may be implicitly configured on one or more of the serving carriers where measurement gap is not configured. When UE 110 measurement gap is configured on all serving carriers including the PCC and one or more SCCs, NCSG should not be configured.

If the UE 110 requires NCSG to prevent the interruption and the UE 110 supporting asynchronous dual connectivity (DC) is configured with a PSCell which is asynchronous with the PCell, then the following NCSG configurations may be made by the network. When there is no measurement gap configured among master cell group (MCG) and secondary cell group (SCG) cell subframes, the E-UTRAN may explicitly provide a single NCSG pattern with a constant repetition period per serving carrier. When Gap Pattern ID #0 is configured for UE 110 on MCG or SCG and no measurement gap is configured on SCG or MCG, a single NCSG pattern with NCSG Pattern ID #2 per Table 1 may be implicitly configured on SCG or MCG.

As shown in FIG. 5, Serving Carrier 1 may have subframes from subframe number i+1 to subframe number i+6 that are used as measurement gap. The NCSG may be implicitly configured on other Serving Carrier 2 subframes from subframe number j+1 to subframe number j+7, where no measurement gap is configured, with a visible interruption length VIL1 before the measurement length ML during which there is no gap, and a visible interruption length VIL2 after the measurement length ML. In NCSG configurations, during the VIL1 period and the VIL2 period, the UE 110 is not expected to transmit or receive any data. During the ML period, the UE 110 is expected to transmit and/or receive data on the corresponding serving carrier. When Gap Pattern ID #1 is configured for UE 110 on MCG or SCG and no measurement gap is configured on SCG or MCG, a single NCSG pattern with NCSG Pattern ID #3 from Table 1 may be implicitly configured on SCG or MCG. In one or more embodiments, UEs may only support those NCSG patterns listed in Table 1 that are relevant to its measurement capabilities, although the scope of the claimed subject matter is not limited in this respect.

In one or more embodiments, network controlled small gap (NCSG) may be configured to prevent interruptions during certain types of measurements as discussed in 3GPP TS 36.133 V14.0.0 (2017 June), for example in Section 7.8 Interruptions with Carrier Aggregation, portions of which are reproduced below.

7.8.2.6 Interruptions During Measurements on SCC for Inter-Band CA

If the UE supports ncsg-r14 and has been configured with NCSG pattern with ID 0, 1, 2, 3, the UE shall not make any autonomous interruptions outside of the configured gap patterns.

If the UE has been configured with gap pattern with ID 0, 1 and there is no inter-frequency and inter-RAT frequency layer to be monitored, the UE shall not make any autonomous interruptions outside of the configured gap patterns. If the UE does not support ncsg-r14 or has not been configured with gap pattern with ID 0, 1 or NCSG pattern with ID 0, 1, 2, 3 or the UE has been configured with gap pattern with ID 0, 1 to monitor inter-frequency/inter-RAT frequency layers, PCell interruptions due to measurements on SCC when the SCell is deactivated are allowed with up to 0.5% probability of missed ACK/NACK when the configured measCycleSCell [2] is 640 ms or longer.

If the UE does not support ncsg-r14 or has not been configured with gap pattern with ID 0, 1 or NCSG pattern with ID 0, 1, 2, 3 or the UE has been configured with gap pattern with ID 0, 1 to monitor inter-frequency/inter-RAT frequency layers, and if indicated by the network using IE allowInterruptions [2], PCell interruptions due to measurements on SCC when the SCell is deactivated are allowed with up to 0.5% probability of missed ACK/NACK regardless of the configured measCycleSCell [2].
Each interruption shall not exceed 1 subframe.

7.8.2.9 Interruptions During Measurements on SCC with Multiple Downlink SCells

If the PCell is not in the same band as any of the SCells being activated or deactivated and if the UE supports ncsg-r14 and has been configured with NCSG pattern with ID 0, 1, 2, 3, the UE shall not make any autonomous interruptions outside of the configured gap patterns.

If the PCell is not in the same band as any of the SCells being activated or deactivated and if the UE has been configured with gap pattern with ID 0, 1 and there is no inter-frequency and inter-RAT frequency layer to be monitored, the UE shall not make any autonomous interruptions outside of the configured gap patterns.

Figure 8:
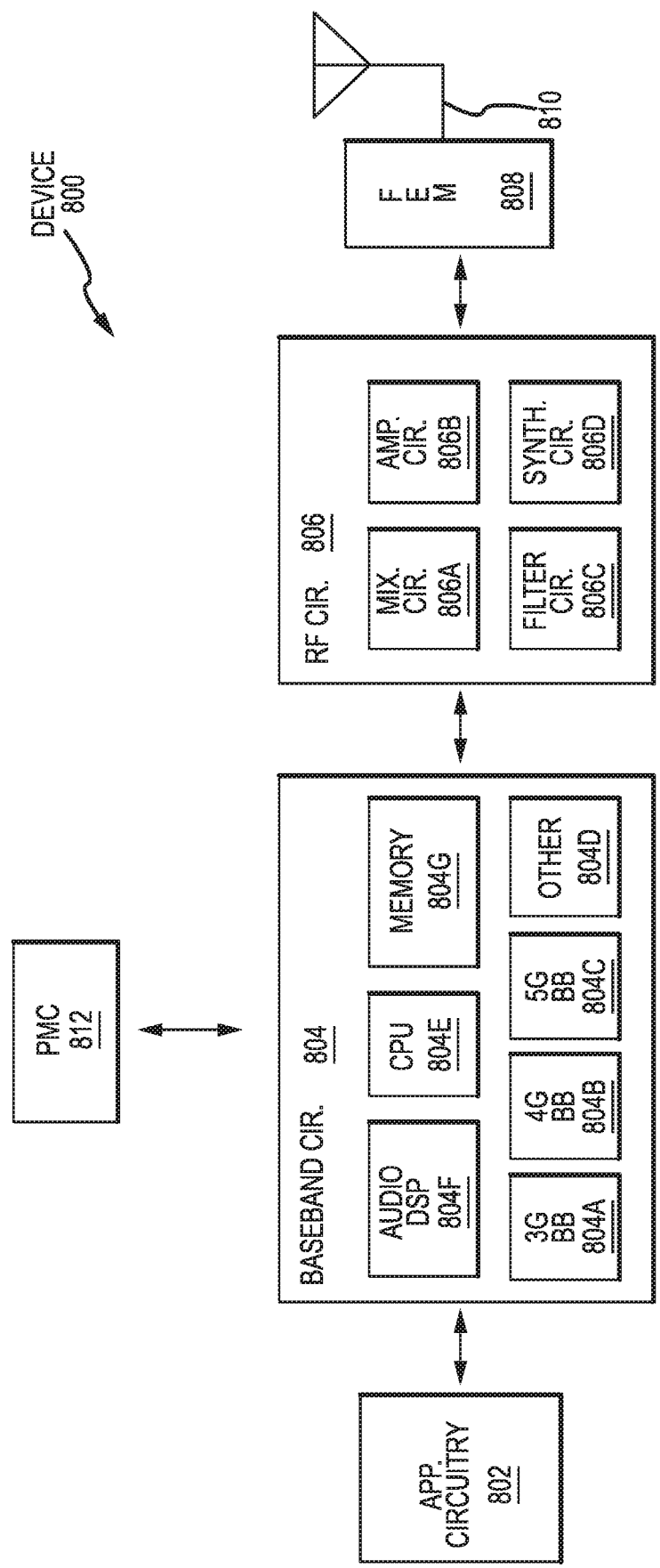
FIG. 8 illustrates example components of a device in accordance with some embodiments.

If the PCell is in the same band as any of the SCells being activated or deactivated or if the UE does not support ncsg-r14 or has not been configured with gap pattern with ID 0, 1 or NCSG pattern with ID 0, 1, 2, 3 or the UE has been configured with gap pattern with ID 0, 1 to monitor inter-frequency/inter-RAT frequency layers, when one SCell is deactivated, the UE is allowed due to measurements on the SCC with deactivated SCell:
  an interruption on PCell with up to 0.5% probability of missed ACK/NACK when the configured measCycleSCell [2] for the deactivated SCell is 640 ms or longer.
  an interruption on PCell with up to 0.5% probability of missed ACK/NACK regardless of the configured measCycleSCell [2] for the deactivated SCell if indicated by the network using IE allowInterruptions [2],
Each interruption shall not exceed:
  1 subframes if the PCell is not in the same band as the deactivated SCell
  5 subframes if the PCell is in the same band as the deactivated SCell
  an interruption on any activated SCell with up to 0.5% probability of missed ACK/NACK when the configured measCycleSCell [2] for the deactivated SCell is 640 ms or longer.
  an interruption on any activated SCell with up to 0.5% probability of missed ACK/NACK regardless of the configured measCycleSCell [2] for the deactivated SCell if indicated by the network using IE allowInterruptions [2].
Each interruption shall not exceed:
  1 subframes if the activated SCell is not in the same band as the deactivated SCell
  5 subframes if the activated SCell is in the same band as the deactivated SCell
If the PCell is in the same band as any of the SCells being activated or deactivated or if the UE does not support ncsg-r14 or has not been configured with gap pattern with ID 0, 1 or NCSG pattern with ID 0, 1, 2, 3 or the UE has been configured with gap pattern with ID 0, 1 to monitor inter-frequency/inter-RAT frequency layers, when two, three, or four SCells are deactivated, the UE is allowed due to measurements on the SCCs with deactivated SCells:
  an interruption on PCell with up to 0.5% probability of missed ACK/NACK when any of the configured measCycleSCell [2] for the deactivated SCells is 640 ms or longer.
  an interruption on PCell with up to 0.5% probability of missed ACK/NACK regardless of the configured measCycleSCell [2] for the deactivated SCells if indicated by the network using IE allowInterruptions [2].
  an interruption on an activated SCell with up to 0.5% probability of missed ACK/NACK when any of the configured measCycleSCell [2] for the deactivated SCells is 640 ms or longer.
  an interruption on an activated SCell with up to 0.5% probability of missed ACK/NACK regardless of the configured measCycleSCell [2] for the deactivated SCells if indicated by the network using IE allowInterruptions [2].
Each interruption on the PCell shall not exceed:
  1 subframes if the PCell is not in the same band as any of the deactivated SCells
  5 subframes if the PCell is in the same band as any of the deactivated SCells
Each interruption on the activated Cell shall not exceed:
  1 subframe if the activated SCell is not in the same band as any of the deactivated SCells
  5 subframes if the activated SCell is in the same band as any of the deactivated SCells 8.1.2.1 UE Measurement Capability If the UE requires measurement gaps to identify and measure inter-frequency and/or inter-RAT cells and the UE does not support perServingCellMeasurementGap-r14 or is not configured with per serving cell measurement gaps, in order for the requirements in the following subsections to apply the E-UTRAN must provide a single measurement gap pattern with constant gap duration for concurrent monitoring of all frequency layers and RATs. If the UE requires measurement gaps to identify and measure inter-frequency and/or inter-RAT cells and the UE supports perServingCellMeasurementGap-r14 and is configured with per serving cell measurement gaps, in order for the requirements in the following subsections to apply the E-UTRAN must provide gap pattern(s) on at least each serving component carrier (per-CC) where the UE has indicated in the perCC-ListGapIndication IE that gaps are required. No gap pattern is required to be provided on the serving component carrier where UE has indicated in the perCC-ListGapIndication IE that gaps are not required. The requirements apply if the gap on each serving cell is at least that which the UE has indicated with gapIndication in the perCC-ListGapIndication IE, and if the gapOffset, MGRP and MGL are the same for each serving component carrier. During the measurement gaps the UE:
During the measurement gaps the UE:
  shall not transmit any data
  is not expected to tune its receiver on any of the E-UTRAN carrier frequencies of PCell and any SCell.
  is not expected to tune its receiver on any of the E-UTRAN carrier frequencies of PCell, PSCell, and SCell.
If the UE supporting dual connectivity is configured with PSCell, during the total interruption time as shown in Figure 8.1.2.1-1, the UE shall not transmit and receive any data in SCG.
In the uplink subframe occurring immediately after the measurement gap,
  if the following conditions are met then it is up to UE implementation whether or not the UE can transmit data:
  all the serving cells belong to E-UTRAN TDD;
  if the subframe occurring immediately before the measurement gap is an uplink subframe.
  Otherwise the UE shall not transmit any data.

In determining the above UE behavior in the uplink subframe occurring immediately after the measurement gap the UE shall treat a special subframe as an uplink subframe if the special subframe occurs immediately before the measurement gap, Inter-frequency and inter-RAT measurement requirements within this clause rely on the UE being configured with one measurement gap pattern unless the UE has signaled that it is capable according to the capability interFreqNeedForGaps or interRATNeedForGaps of conducting such measurements without gaps and without interruption. UEs shall only support those measurement gap patterns listed in Table 8.1.2.1-1 and table 8.1.2.1.-2 that are relevant to its measurement capabilities. UEs supporting network controlled small gap and which have signaled that they are capable of measurements without gap but requiring NCSG, can be configured with a network controlled small gap pattern in table 8.1.2.1.3-1 on all component carrier(s) to perform inter-frequency and inter-RAT measurement.

ProSe capable UE is allowed to perform ProSe transmissions during the measurement gaps that are not used for measurements if the requirements specified in section 8 for inter-frequency and inter-RAT measurements are fulfilled.

TABLE 2

Table 8.1.2.1-1: Gap Pattern Configurations supported by the UE

| Gap Pattern Id | MeasurementGap Length (MGL, ms) | Measurement Gap Repetition Period (MGRP, ms) | Minimum available time for inter-frequency and inter-RAT measurements during 480 ms period (Tinter1, ms) | Measurement Purpose |
|---|---|---|---|---|
| 0 | 6 | 40 | 60 | Inter-Frequency E-UTRAN FDD and TDD, UTRAN FDD, GERAN, LCR TDD, HRPD, CDMA2000 1x |
| 1 | 6 | 80 | 30 | Inter-Frequency E-UTRAN FDD and TDD, UTRAN FDD, GERAN, LCR TDD, HRPD, CDMA2000 1x |
| 2 | 3 | 40 | 24$^{NOTE\ 1,\ 2}$ | Inter-Frequency E-UTRAN FDD and TDD for cells with time difference as specified below |
| 3 | 3 | 80 | 12$^{NOTE\ 1,\ 2}$ | Inter-Frequency E-UTRAN FDD and TDD for cells with time difference according as specified below. |

NOTE 1:

When determing UE requirements using Tinter1 for GP2 and GP3, Tinter1 = [60] for GP2 and Tinter1 = [30] for GP3 shall be used.

NOTE 2:

This gap pattern is supported by UEs which support shortMeasurementGap-r14

TABLE 3

Table 8.1.2.1-2: Gap Pattern Configurations for UE supporting low density burst gap patterns

| Gap Pattern Id | MeasurementGap Length (MGL, ms) | Measurement Gap Repetition Period (MGRP, ms) | Number of gaps per burst | Burst repetition period Tburst | Measurement Purpose |
|---|---|---|---|---|---|
| nonUniform1 | 6 | 40 | 13 | 1.28 s | Inter-Frequency E-UTRAN FDD and TDD |
| nonUniform2 | 6 | 40 | 13 | 2.56 s | Inter-Frequency E-UTRAN FDD and TDD |
| nonUniform3 | 6 | 40 | 13 | 5.12 s | Inter-Frequency E-UTRAN FDD and TDD |

TABLE 3-continued

Table 8.1.2.1-2: Gap Pattern Configurations for
UE supporting low density burst gap patterns

| Gap Pattern Id | MeasurementGap Length (MGL, ms) | Measurement Gap Repetition Period (MGRP, ms) | Number of gaps per burst | Burst repetition period Tburst | Measurement Purpose |
| --- | --- | --- | --- | --- | --- |
| nonUniform4 | 6 | 40 | 13 | 10.24 s | Inter-Frequency E-UTRAN FDD and TDD |

NOTE 1:
When determing UE requirements nonUniform1, nonUniform2, nonUniform3 or nonUniform4, 60 ms shall be assumed as the minimum available time for inter-frequency and inter-RAT measurements during each burst.
NOTE 2:
The Gap patterns nonUniform1, nonUniform2, nonUniform3 and nonUniform4 cannot be be combined with IncMon reduced performance group When inter-frequency RSTD measurements are configured and the UE requires measurement gaps for performing such measurements, only Gap Pattern 0 can be used. For defining the inter-frequency and inter-RAT requirements Tinter1=30 ms shall be assumed.

A measurement gap starts at the end of the latest subframe occurring immediately before the measurement gap among MCG serving cells subframes.

MGL is the time from start of tuning to end of retuning, which is aligned between MCG and SCG.

For GP0 and GP1 The total interruption time on SCG is 6 subframes for synchronous dual connectivity, and the total interruption time on SCG is 7 subframes for asynchronous dual connectivity. As shown in Figure 8.1.2.1-1, MCG subframes from i+1 to i+6 are included in total interruption time together with SCG subframes from j+1 to j+6 for synchronous dual connectivity and j+1 to j+7 for asynchronous dual connectivity.

For GP0 and GP1 and asynchronous dual connectivity as shown in Figure 8.1.2.1-1 (b), subframe j is regarded as the subframe occurring immediately before the measurement gap for SCG, similarly, subframe j+8 is regarded as the subframe occurring immediately after the measurement gap for SCG.

For GP2 and GP3 the total interruption time on SCG is 3 subframes for synchronous dual connectivity, and the total interruption time on SCG is 4 subframes for asynchronous dual connectivity. The total interrupt is applied in same spirit as shown in Figure 8.1.2.1-1. I.e. For MCG subframes from i+1 to i+3 are included in total interruption time together with SCG subframes from j+1 to j+3 for synchronous dual connectivity and j+1 to j+4 for asynchronous dual connectivity.

For GP2 and GP3 and asynchronous dual connectivity as shown in Figure 8.1.2.1-1 (b) with measurement gap length 3, subframe j is regarded as the subframe occurring immediately before the measurement gap for SCG, similarly, subframe j+5 is regarded as the subframe occurring immediately after the measurement gap for SCG.

nonUniform1-nonUniform4 gap patterns are shown in Figure 8.1.2.1-2. A burst repetition period Tburst is consisted of T1 and T2. During T1, UE performs measurement during the gap. During T2, UE suspends measurement gap. Both UE and eNB can assume there is no gap during T2. T1 equals to number of gaps per burst in Table 8.1.2.1-2. Tburst is configured by the higher layers. For nonUniform1-nonUniform4 the total interruption time on SCG is same as for GP0 and GP1 for both synchronous and asynchronous dual connectivity as shown in Figure 8.1.2.1-1. For asynchronous dual connectivity as shown in Figure 8.1.2.1-1 (b), subframe j is regarded as the subframe occurring immediately before the measurement gap for SCG, similarly, subframe j+8 is regarded as the subframe occurring immediately after the measurement gap for SCG.

Figure 6:
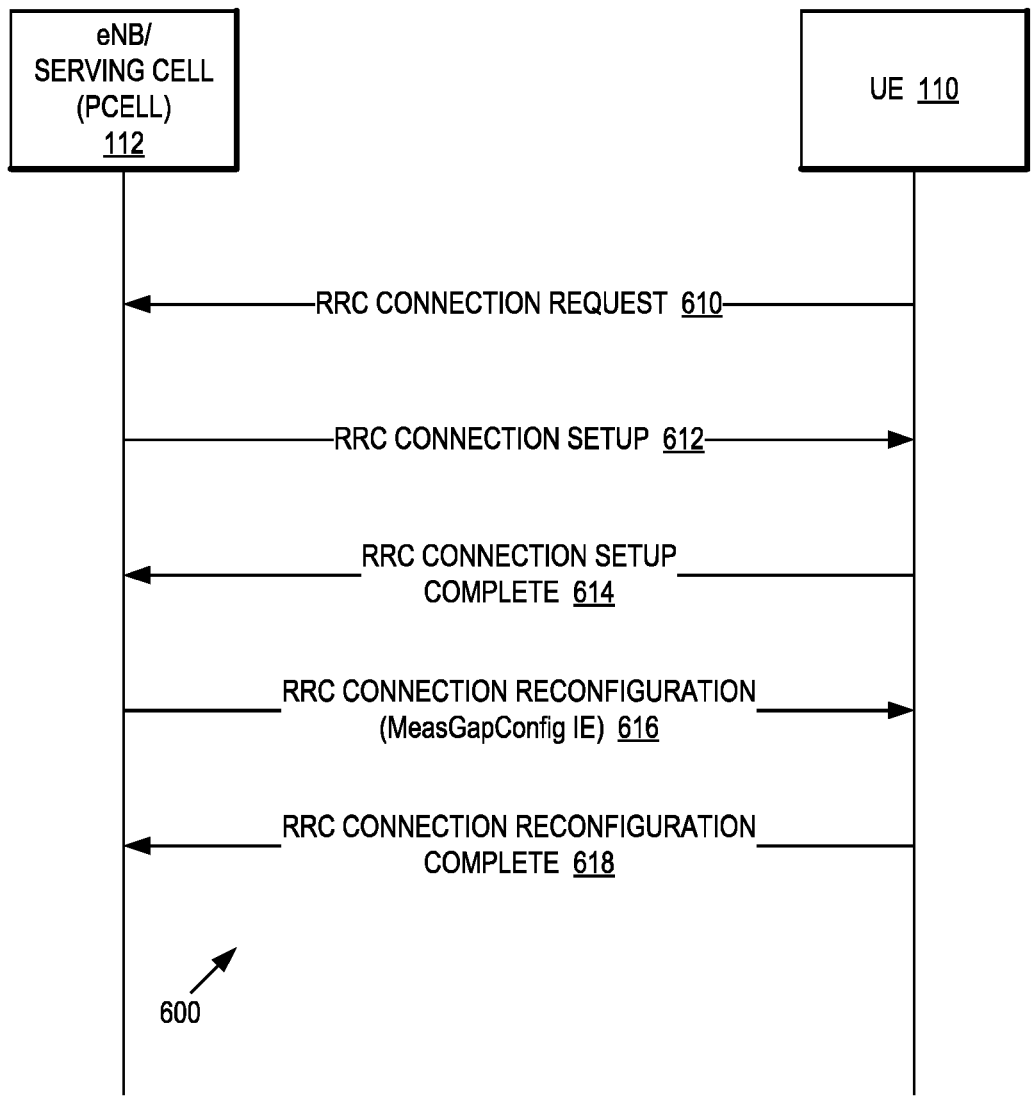
FIG. 6 is a flow diagram of an RRC reconfiguration process that includes a measurement gap configuration in accordance with one or more embodiments.

Referring now to FIG. 6, a flow diagram of an RRC reconfiguration process that includes a measurement gap configuration in accordance with one or more embodiments will be discussed. As shown in FIG. 6, process 100 may include a radio resource control (RRC) connection request message 610 being sent from UE 110 to the serving cell or eNB 112. The RRCE connection request message 610 may include information regarding the measurement gap capability of the UE 110. An RRC connection setup message 612 is then sent from eNB 112 to UE 110, and the UE 110 returns an RRC connection setup complete message 614 to eNB 112. The RRC connection setup message 612 may include measurement gap configuration information including a measurement gap configuration information element (MeasGapConfig IE) for the UE 110 and further including network controlled small gap (NCSG) configuration information such as a selected NCSG ID from Table 1.

The serving cell or eNB 112 may transmit an RRC connection reconfiguration message 616 to the UE 110 wherein the RRC connection reconfiguration message 616 may include measurement gap configuration information including a measurement gap configuration information element (MeasGapConfig IE) for the UE 110 and further including network controlled small gap (NCSG) configuration information such as a selected NCSG ID from Table 1. The UE 110 may then respond with an RRC connection reconfiguration complete message 618 to the serving cell or eNB 112.

Figure 7:
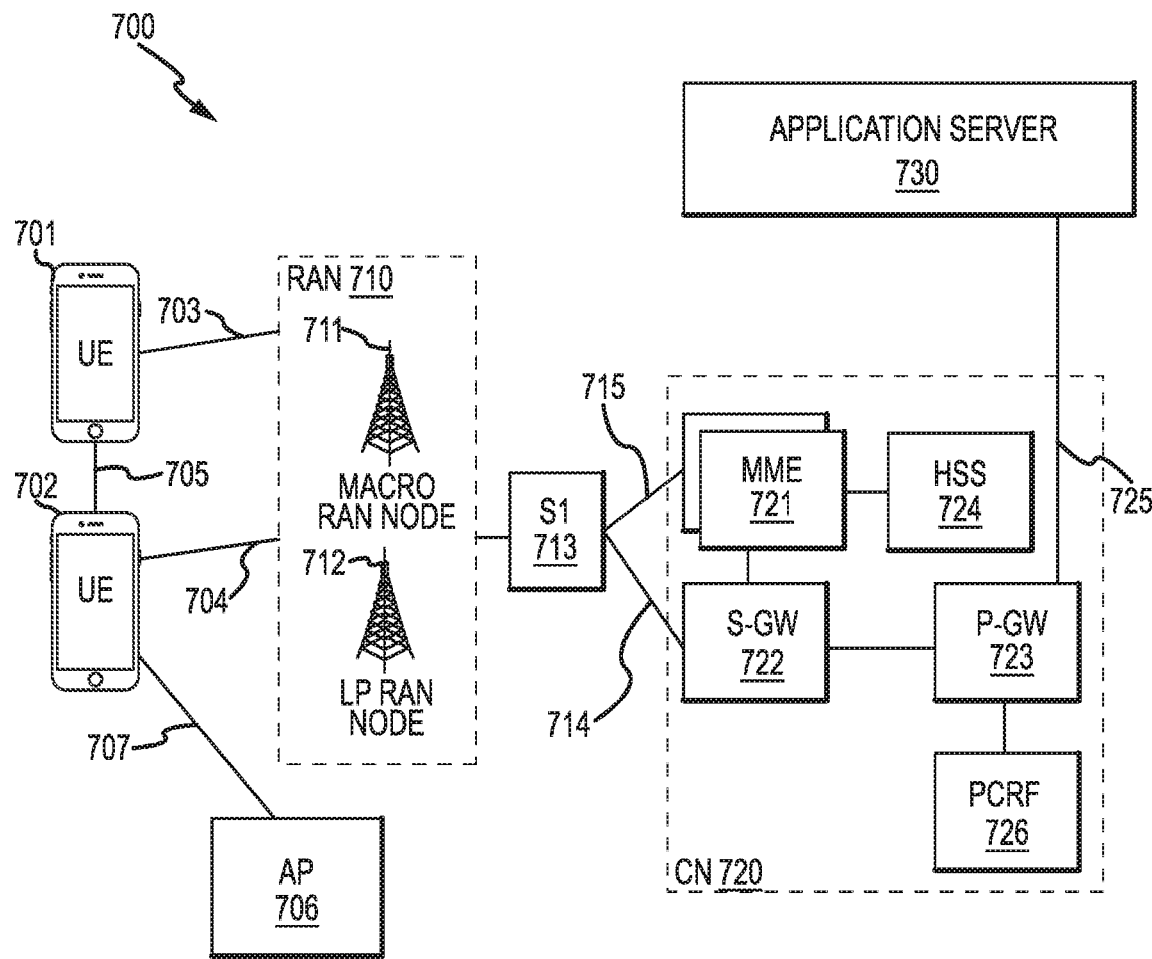
FIG. 7 illustrates an architecture of a system of a network in accordance with some embodiments.

FIG. 7 illustrates an architecture of a system 700 of a network in accordance with some embodiments. The system 700 is shown to include a user equipment (UE) 701 and a UE 702. The UEs 701 and 702 are illustrated as smartphones (e.g., handheld touchscreen mobile computing devices connectable to one or more cellular networks) but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 701 and 702 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 701 and 702 may be configured to connect, e.g., communicatively couple, with a radio access network (RAN) 710—the RAN 710 may be, for example, an Evolved Universal Mobile Telecommunications System (UMTS) Terrestrial Radio Access Network (E-UTRAN), a NextGen RAN (NG RAN), or some other type of RAN. The UEs 701 and 702 utilize connections 703 and 704, respectively, each of which comprises a physical communications interface or layer (discussed in further detail below); in this example, the connections 703 and 704 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 701 and 702 may further directly exchange communication data via a ProSe interface 705. The ProSe interface 705 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 702 is shown to be configured to access an access point (AP) 706 via connection 707. The connection 707 can comprise a local wireless connection, such as a connection consistent with any IEEE 802.11 protocol, wherein the AP 706 would comprise a wireless fidelity (WiFi®) router. In this example, the AP 706 is shown to be connected to the Internet without connecting to the core network of the wireless system (described in further detail below).

The RAN 710 can include one or more access nodes that enable the connections 703 and 704. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell). The RAN 710 may include one or more RAN nodes for providing macrocells, e.g., macro RAN node 711, and one or more RAN nodes for providing femtocells or picocells (e.g., cells having smaller coverage areas, smaller user capacity, or higher bandwidth compared to macrocells), e.g., low power (LP) RAN node 712.

Any of the RAN nodes 711 and 712 can terminate the air interface protocol and can be the first point of contact for the UEs 701 and 702. In some embodiments, any of the RAN nodes 711 and 712 can fulfill various logical functions for the RAN 710 including, but not limited to, radio network controller (RNC) functions such as radio bearer management, uplink and downlink dynamic radio resource management and data packet scheduling, and mobility management.

In accordance with some embodiments, the UEs 701 and 702 can be configured to communicate using Orthogonal Frequency-Division Multiplexing (OFDM) communication signals with each other or with any of the RAN nodes 711 and 712 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 711 and 712 to the UEs 701 and 702, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 701 and 702. The physical downlink control channel (PDCCH) may carry information about the transport format and resource allocations related to the PDSCH channel, among other things. It may also inform the UEs 701 and 702 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 711 and 712 based on channel quality information fed back from any of the UEs 701 and 702. The downlink resource assignment information may be sent on the PDCCH used for (e.g., assigned to) each of the UEs 701 and 702.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 710 is shown to be communicatively coupled to a core network (CN) 720—via an S1 interface 713. In embodiments, the CN 720 may be an evolved packet core (EPC) network, a NextGen Packet Core (NPC) network, or some other type of CN. In this embodiment the S1 interface 713 is split into two parts: the S1-U interface 714, which carries traffic data between the RAN nodes 711 and 712 and the serving gateway (S-GW) 722, and the S1-mobility management entity (MME) interface 715, which is a signaling interface between the RAN nodes 711 and 712 and MMEs 721.

In this embodiment, the CN 720 comprises the MMEs 721, the S-GW 722, the Packet Data Network (PDN) Gateway (P-GW) 723, and a home subscriber server (HSS) 724. The MMEs 721 may be similar in function to the control plane of legacy Serving General Packet Radio Service (GPRS) Support Nodes (SGSN). The MMEs 721 may manage mobility aspects in access such as gateway selection and tracking area list management. The HSS 724 may comprise a database for network users, including subscription-related information to support the network entities' handling of communication sessions. The CN 720 may comprise one or several HSSs 724, depending on the number of mobile subscribers, on the capacity of the equipment, on the organization of the network, etc. For example, the HSS 724 can provide support for routing/roaming, authentication, authorization, naming/addressing resolution, location dependencies, etc.

The S-GW 722 may terminate the S1 interface 713 towards the RAN 710, and routes data packets between the RAN 710 and the CN 720. In addition, the S-GW 722 may be a local mobility anchor point for inter-RAN node handovers and also may provide an anchor for inter-3GPP mobility. Other responsibilities may include lawful intercept, charging, and some policy enforcement.

The P-GW 723 may terminate an SGi interface toward a PDN. The P-GW 723 may route data packets between the EPC network 723 and external networks such as a network including the application server 730 (alternatively referred to as application function (AF)) via an Internet Protocol (IP) interface 725. Generally, the application server 730 may be an element offering applications that use IP bearer resources with the core network (e.g., UMTS Packet Services (PS) domain, LTE PS data services, etc.). In this embodiment, the P-GW 723 is shown to be communicatively coupled to an application server 730 via an IP communications interface 725. The application server 730 can also be configured to support one or more communication services (e.g., Voice-over-Internet Protocol (VoIP) sessions, PTT sessions, group communication sessions, social networking services, etc.) for the UEs 701 and 702 via the CN 720.

The P-GW 723 may further be a node for policy enforcement and charging data collection. Policy and Charging Enforcement Function (PCRF) 726 is the policy and charging control element of the CN 720. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 726 may be communicatively coupled to the application server 730 via the P-GW 723. The application server 730 may signal the PCRF 726 to indicate a new service flow and select the appropriate Quality of Service (QoS) and charging parameters. The PCRF 726 may provision this rule into a Policy and Charging Enforcement Function (PCEF) (not shown) with the appropriate traffic flow template (TFT) and QoS class of identifier (QCI), which commences the QoS and charging as specified by the application server 730.

FIG. 8 illustrates example components of a device 800 in accordance with some embodiments. In some embodiments, the device 800 may include application circuitry 802, baseband circuitry 804, Radio Frequency (RF) circuitry 806, front-end module (FEM) circuitry 808, one or more antennas 810, and power management circuitry (PMC) 812 coupled together at least as shown. The components of the illustrated device 800 may be included in a UE or a RAN node. In some embodiments, the device 800 may include less elements (e.g., a RAN node may not utilize application circuitry 802, and instead include a processor/controller to process IP data received from an EPC). In some embodiments, the device 800 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 802 may include one or more application processors. For example, the application circuitry 802 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 800. In some embodiments, processors of application circuitry 802 may process IP data packets received from an EPC.

The baseband circuitry 804 may include circuitry such as, but not limited to, one or more single-core or multi-core processors. The baseband circuitry 804 may include one or more baseband processors or control logic to process baseband signals received from a receive signal path of the RF circuitry 806 and to generate baseband signals for a transmit signal path of the RF circuitry 806. Baseband processing circuitry 804 may interface with the application circuitry 802 for generation and processing of the baseband signals and for controlling operations of the RF circuitry 806. For example, in some embodiments, the baseband circuitry 804 may include a third generation (3G) baseband processor 804A, a fourth generation (4G) baseband processor 804B, a fifth generation (5G) baseband processor 804C, or other baseband processor(s) 804D for other existing generations, generations in development or to be developed in the future (e.g., second generation (2G), sixth generation (6G), etc.). The baseband circuitry 804 (e.g., one or more of baseband processors 804A-D) may handle various radio control functions that enable communication with one or more radio networks via the RF circuitry 806. In other embodiments, some or all of the functionality of baseband processors 804A-D may be included in modules stored in the memory 804G and executed via a Central Processing Unit (CPU) 804E. The radio control functions may include, but are not limited to, signal modulation/demodulation, encoding/decoding, radio frequency shifting, etc. In some embodiments, modulation/demodulation circuitry of the baseband circuitry 804 may include Fast-Fourier Transform (FFT), preceding, or constellation mapping/demapping functionality. In some embodiments, encoding/decoding circuitry of the baseband circuitry 804 may include convolution, tail-biting convolution, turbo, Viterbi, or Low-Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 804 may include one or more audio digital signal processor(s) (DSP) 804F. The audio DSP(s) 804F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 804 and the application circuitry 802 may be implemented together such as, for example, on a system on a chip (SOC).

In some embodiments, the baseband circuitry 804 may provide for communication compatible with one or more radio technologies. For example, in some embodiments, the baseband circuitry 804 may support communication with an evolved universal terrestrial radio access network (EU-TRAN) or other wireless metropolitan area networks (WMAN), a wireless local area network (WLAN), a wireless personal area network (WPAN). Embodiments in which the baseband circuitry 804 is configured to support radio communications of more than one wireless protocol may be referred to as multi-mode baseband circuitry.

RF circuitry 806 may enable communication with wireless networks using modulated electromagnetic radiation through a non-solid medium. In various embodiments, the RF circuitry 806 may include switches, filters, amplifiers, etc. to facilitate the communication with the wireless network. RF circuitry 806 may include a receive signal path which may include circuitry to down-convert RF signals received from the FEM circuitry 808 and provide baseband signals to the baseband circuitry 804. RF circuitry 806 may also include a transmit signal path which may include circuitry to up-convert baseband signals provided by the baseband circuitry 804 and provide RF output signals to the FEM circuitry 808 for transmission.

In some embodiments, the receive signal path of the RF circuitry 806 may include mixer circuitry 806a, amplifier circuitry 806b and filter circuitry 806c. In some embodiments, the transmit signal path of the RF circuitry 806 may include filter circuitry 806c and mixer circuitry 806a. RF circuitry 806 may also include synthesizer circuitry 806d for synthesizing a frequency for use by the mixer circuitry 806a of the receive signal path and the transmit signal path. In some embodiments, the mixer circuitry 806a of the receive signal path may be configured to down-convert RF signals received from the FEM circuitry 808 based on the synthesized frequency provided by synthesizer circuitry 806d. The amplifier circuitry 806b may be configured to amplify the down-converted signals and the filter circuitry 806c may be a low-pass filter (LPF) or band-pass filter (BPF) configured to remove unwanted signals from the down-converted signals to generate output baseband signals. Output baseband signals may be provided to the baseband circuitry 804 for further processing. In some embodiments, the output baseband signals may be zero-frequency baseband signals, although this is not a requirement. In some embodiments, mixer circuitry 806a of the receive signal path may comprise passive mixers, although the scope of the embodiments is not limited in this respect.

In some embodiments, the mixer circuitry 806a of the transmit signal path may be configured to up-convert input baseband signals based on the synthesized frequency provided by the synthesizer circuitry 806d to generate RF output signals for the FEM circuitry 808. The baseband signals may be provided by the baseband circuitry 804 and may be filtered by filter circuitry 806c.

In some embodiments, the mixer circuitry 806a of the receive signal path and the mixer circuitry 806a of the transmit signal path may include two or more mixers and may be arranged for quadrature downconversion and upconversion, respectively. In some embodiments, the mixer circuitry 806a of the receive signal path and the mixer circuitry 806a of the transmit signal path may include two or more mixers and may be arranged for image rejection (e.g., Hartley image rejection). In some embodiments, the mixer circuitry 806a of the receive signal path and the mixer circuitry 806a may be arranged for direct downconversion and direct upconversion, respectively. In some embodiments, the mixer circuitry 806a of the receive signal path and the mixer circuitry 806a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 806 may include analog-to-digital converter (ADC) and digital-to-analog converter (DAC) circuitry and the baseband circuitry 804 may include a digital baseband interface to communicate with the RF circuitry 806.

In some dual-mode embodiments, a separate radio IC circuitry may be provided for processing signals for each spectrum, although the scope of the embodiments is not limited in this respect. In some embodiments, the synthesizer circuitry 806d may be a fractional-N synthesizer or a fractional N/N+1 synthesizer, although the scope of the embodiments is not limited in this respect as other types of frequency synthesizers may be suitable. For example, synthesizer circuitry 806d may be a delta-sigma synthesizer, a frequency multiplier, or a synthesizer comprising a phase-locked loop with a frequency divider.

The synthesizer circuitry 806d may be configured to synthesize an output frequency for use by the mixer circuitry 806a of the RF circuitry 806 based on a frequency input and a divider control input. In some embodiments, the synthesizer circuitry 806d may be a fractional N/N+1 synthesizer.

In some embodiments, frequency input may be provided by a voltage-controlled oscillator (VCO), although that is not a requirement. Divider control input may be provided by either the baseband circuitry 804 or the applications processor 802 depending on the desired output frequency. In some embodiments, a divider control input (e.g., N) may be determined from a look-up table based on a channel indicated by the applications processor 802.

Synthesizer circuitry 806*d* of the RF circuitry 806 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 806*d* may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 806 may include an IQ/polar converter.

FEM circuitry 808 may include a receive signal path which may include circuitry configured to operate on RF signals received from one or more antennas 810, amplify the received signals and provide the amplified versions of the received signals to the RF circuitry 806 for further processing. FEM circuitry 808 may also include a transmit signal path which may include circuitry configured to amplify signals for transmission provided by the RF circuitry 806 for transmission by one or more of the one or more antennas 810. In various embodiments, the amplification through the transmit or receive signal paths may be done solely in the RF circuitry 806, solely in the FEM 808, or in both the RF circuitry 806 and the FEM 808.

In some embodiments, the FEM circuitry 808 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 806). The transmit signal path of the FEM circuitry 808 may include a power amplifier (PA) to amplify input RF signals (e.g., provided by RF circuitry 806), and one or more filters to generate RF signals for subsequent transmission (e.g., by one or more of the one or more antennas 810).

In some embodiments, the PMC 812 may manage power provided to the baseband circuitry 804. In particular, the PMC 812 may control power-source selection, voltage scaling, battery charging, or DC-to-DC conversion. The PMC 812 may often be included when the device 800 is capable of being powered by a battery, for example, when the device is included in a UE. The PMC 812 may increase the power conversion efficiency while providing desirable implementation size and heat dissipation characteristics.

While FIG. 8 shows the PMC 812 coupled only with the baseband circuitry 804. However, in other embodiments, the PMC 812 may be additionally or alternatively coupled with, and perform similar power management operations for, other components such as, but not limited to, application circuitry 802, RF circuitry 806, or FEM 808.

In some embodiments, the PMC 812 may control, or otherwise be part of, various power saving mechanisms of the device 800. For example, if the device 800 is in an RRC_Connected state, where it is still connected to the RAN node as it expects to receive traffic shortly, then it may enter a state known as Discontinuous Reception Mode (DRX) after a period of inactivity. During this state, the device 800 may power down for brief intervals of time and thus save power.

If there is no data traffic activity for an extended period of time, then the device 800 may transition off to an RRC_Idle state, where it disconnects from the network and does not perform operations such as channel quality feedback, handover, etc. The device 800 goes into a very low power state and it performs paging where again it periodically wakes up to listen to the network and then powers down again. The device 800 may not receive data in this state, in order to receive data, it must transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 802 and processors of the baseband circuitry 804 may be used to execute elements of one or more instances of a protocol stack. For example, processors of the baseband circuitry 804, alone or in combination, may be used execute Layer 3, Layer 2, or Layer 1 functionality, while processors of the application circuitry 804 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 9:
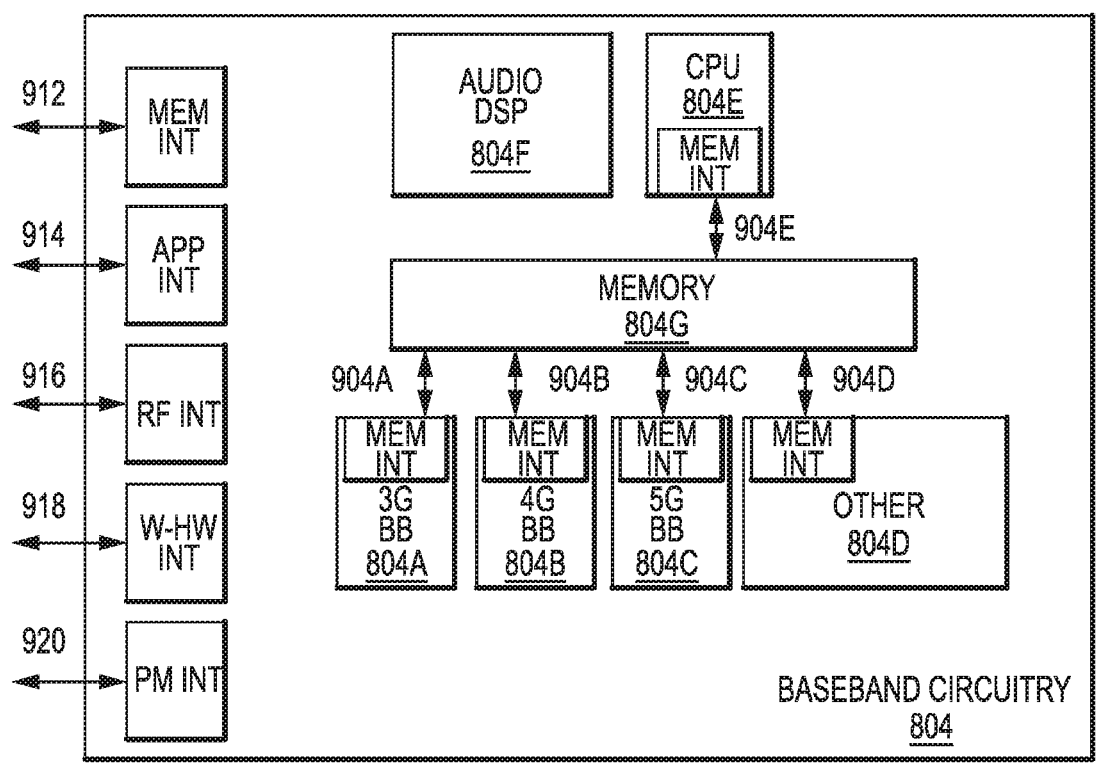
FIG. 9 illustrates example interfaces of baseband circuitry in accordance with some embodiments.

FIG. 9 illustrates example interfaces of baseband circuitry in accordance with some embodiments. As discussed above, the baseband circuitry 804 of FIG. 8 may comprise processors 804A-804E and a memory 804G utilized by said processors. Each of the processors 804A-804E may include a memory interface, 904A-904E, respectively, to send/receive data to/from the memory 804G.

The baseband circuitry 804 may further include one or more interfaces to communicatively couple to other circuitries/devices, such as a memory interface 912 (e.g., an interface to send/receive data to/from memory external to the baseband circuitry 804), an application circuitry interface 914 (e.g., an interface to send/receive data to/from the application circuitry 802 of FIG. 8), an RF circuitry interface 916 (e.g., an interface to send/receive data to/from RF circuitry 806 of FIG. 8), a wireless hardware connectivity interface 918 (e.g., an interface to send/receive data to/from Near Field Communication (NFC) components, Bluetooth® components (e.g., Bluetooth® Low Energy), Wi-Fi® components, and other communication components), and a power management interface 920 (e.g., an interface to send/receive power or control signals to/from the PMC 812.

The following are example implementations of the subject matter described herein. It should be noted that any of the examples and the variations thereof described herein may be used in any permutation or combination of any other one or more examples or variations, although the scope of the claimed subject matter is not limited in these respects.

In example one, an n apparatus of an evolved NodeB (eNB) comprises one or more baseband processors to encode measurement gap configuration information including a measurement gap configuration information element MeasGapConfig to configure a network controlled small gap (NCSG) pattern for a user equipment (UE) device if the UE requires an NCSG and the UE is not configured with a primary secondary cell (PSCELL), and a memory to store the measurement gap configuration information. Example two may include the subject matter of example one or any of the examples described herein, wherein the NCSG pattern comprises a single NCSG pattern with a constant repetition period for the UE if no measurement gap is configured among a primary cell and one or more secondary cell subframes. Example three may include the subject matter of example one or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example four may include the subject matter of example one or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example five may include the subject matter of example one or any of the examples described herein, wherein no NCSG pattern is configured if a measurement gap pattern is configured on all serving carriers including a primary component carrier (PCC) and one or more secondary component carriers (SCCs).

In example six, an apparatus of an evolved NodeB (eNB) comprises one or more baseband processors to encode measurement gap configuration information including a measurement gap configuration information element MeasGapConfig to configure a network controlled small gap (NCSG) pattern for a user equipment (UE) device if the UE requires an NCSG and the UE is capable of supporting dual connectivity and configured with a primary secondary cell (PSCELL), and a memory to store the measurement gap configuration information. Example seven may include the subject matter of example six or any of the examples described herein, wherein the NCSG pattern comprises a single NCSG pattern with a constant repetition period per serving carrier if no measurement gap is configured among master cell group (MCG) subframes and secondary cell group (SCG) subframes. Example eight may include the subject matter of example six or any of the examples described herein, wherein the NCSG pattern comprises NCSG pattern ID #2 on a secondary cell group (SCG) if Gap Pattern ID #0 is configured for the UE on a master cell group (MCG) and no measurement gap is configured on the SCG. Example nine may include the subject matter of example six or any of the examples described herein, wherein the NCSG pattern comprises NCSG pattern ID #3 on a secondary cell group (SCG) if Gap Pattern ID #1 is configured for the UE on a master cell group (MCG) and no measurement gap is configured on the SCG.

In example ten, an apparatus of a user equipment (UE) comprises one or more baseband processors to decode a measurement gap configuration information including a measurement gap configuration information element MeasGapConfig to configure a network controlled small gap (NCSG) pattern for the UE if the UE requires an NCSG and the UE is not configured with a primary secondary cell (PSCELL), and a memory to store the measurement gap configuration information. Example eleven may include the subject matter of example ten or any of the examples described herein, wherein the NCSG pattern comprises a single NCSG pattern with a constant repetition period for the UE if no measurement gap is configured among a primary cell and one or more secondary cell subframes. Example twelve may include the subject matter of example ten or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example thirteen may include the subject matter of example ten or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example fourteen may include the subject matter of example ten or any of the examples described herein, wherein no NCSG pattern is configured if a measurement gap pattern is configured on all serving carriers including a primary component carrier (PCC) and one or more secondary component carriers (SCCs).

In example fifteen, one or more machine-readable media may have instructions stored thereon that, when executed by an evolved NodeB (eNB), result in encoding measurement gap configuration information including a measurement gap configuration information element MeasGapConfig to configure a network controlled small gap (NCSG) pattern for a user equipment (UE) device if the UE requires an NCSG and the UE is not configured with a primary secondary cell (PSCELL), and causing the measurement gap configuration information to be transmitted to the UE in a radio resource control (RRC) connection reconfiguration message. Example sixteen may include the subject matter of example fifteen or any of the examples described herein, wherein the NCSG pattern comprises a single NCSG pattern with a constant repetition period for the UE if no measurement gap is configured among a primary cell and one or more secondary cell subframes. Example seventeen may include the subject matter of example fifteen or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example eighteen may include the subject matter of example fifteen or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example nineteen may include the subject matter of example fifteen or any of the examples described herein, wherein no NCSG pattern is configured if a measurement gap pattern is configured on all serving carriers including a primary component carrier (PCC) and one or more secondary component carriers (SCCs).

In example twenty, one or more machine-readable media may have instructions stored thereon that, when executed by an apparatus of an evolved NodeB (eNB), result in encoding measurement gap configuration information including a measurement gap configuration information element MeasGapConfig to configure a network controlled small gap (NCSG) pattern for a user equipment (UE) device if the UE requires an NCSG and the UE is capable of supporting dual connectivity and configured with a primary secondary cell (PSCELL), and causing the measurement gap configuration information to be transmitted to the UE in a radio resource control (RRC) connection reconfiguration message. Example twenty-one may include the subject matter of example twenty or any of the examples described herein, wherein the NCSG pattern comprises a single NCSG pattern with a constant repetition period per serving carrier if no measurement gap is configured among master cell group (MCG) subframes and secondary cell group (SCG) subframes. Example twenty-two may include the subject matter of example twenty or any of the examples described herein, wherein the NCSG pattern comprises NCSG pattern ID #2 on a secondary cell group (SCG) if Gap Pattern ID #0 is configured for the UE on a master cell group (MCG) and no measurement gap is configured on the SCG. Example twenty-three may include the subject matter of example twenty or any of the examples described herein, wherein the NCSG pattern comprises NCSG pattern ID #3 on a secondary cell group (SCG) if Gap Pattern ID #1 is configured for the UE on a master cell group (MCG) and no measurement gap is configured on the SCG.

In example twenty-four, one or more machine-readable media may have instructions stored thereon that, when executed by an apparatus of a user equipment (UE), result in decoding a measurement gap configuration information including a measurement gap configuration information element MeasGapConfig to configure a network controlled small gap (NCSG) pattern for the UE if the UE requires an NCSG and the UE is not configured with a primary secondary cell (PSCELL), and obtaining one or more measurements on a neighbor cell according to the measurement gap configuration information. Example twenty-five may include the subject matter of example twenty-four or any of the examples described herein, wherein the NCSG pattern comprises a single NCSG pattern with a constant repetition period for the UE if no measurement gap is configured among a primary cell and one or more secondary cell subframes. Example twenty-six may include the subject matter of example twenty-four or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example twenty-seven may include the subject matter of example twenty-four or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example twenty-eight may include the subject matter of example twenty-four or any of the examples described herein, wherein no NCSG pattern is configured if a measurement gap pattern is configured on all serving carriers including a primary component carrier (PCC) and one or more secondary component carriers (SCCs).

In example twenty-nine, an apparatus of an evolved NodeB (eNB) comprises means for encoding measurement gap configuration information including a measurement gap configuration information element MeasGapConfig to configure a network controlled small gap (NCSG) pattern for a user equipment (UE) device if the UE requires an NCSG and the UE is not configured with a primary secondary cell (PSCELL), and means for causing the measurement gap configuration information to be transmitted to the UE in a radio resource control (RRC) connection reconfiguration message. Example thirty may include the subject matter of example twenty-nine or any of the examples described herein, wherein the NCSG pattern comprises a single NCSG pattern with a constant repetition period for the UE if no measurement gap is configured among a primary cell and one or more secondary cell subframes. Example thirty-one may include the subject matter of example twenty-nine or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example thirty-two may include the subject matter of example twenty-nine or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example thirty-three may include the subject matter of example twenty-nine or any of the examples described herein, wherein no NCSG pattern is configured if a measurement gap pattern is configured on all serving carriers including a primary component carrier (PCC) and one or more secondary component carriers (SCCs).

In example thirty-four, an apparatus of an evolved NodeB (eNB), comprises means for encoding measurement gap configuration information including a measurement gap configuration information element MeasGapConfig to configure a network controlled small gap (NCSG) pattern for a user equipment (UE) device if the UE requires an NCSG and the UE is capable of supporting dual connectivity and configured with a primary secondary cell (PSCELL), and means for causing the measurement gap configuration information to be transmitted to the UE in a radio resource control (RRC) connection reconfiguration message. Example thirty-five may include the subject matter of example thirty-four or any of the examples described herein, wherein the NCSG pattern comprises a single NCSG pattern with a constant repetition period per serving carrier if no measurement gap is configured among master cell group (MCG) subframes and secondary cell group (SCG) subframes. Example thirty-six may include the subject matter of example thirty-four or any of the examples described herein, wherein the NCSG pattern comprises NCSG pattern ID #2 on a secondary cell group (SCG) if Gap Pattern ID #0 is configured for the UE on a master cell group (MCG) and no measurement gap is configured on the SCG. Example thirty-seven may include the subject matter of example thirty-four or any of the examples described herein, wherein the NCSG pattern comprises NCSG pattern ID #3 on a secondary cell group (SCG) if Gap Pattern ID #1 is configured for the UE on a master cell group (MCG) and no measurement gap is configured on the SCG.

In example thirty-eight, an apparatus of a user equipment (UE) comprises means for decoding a measurement gap configuration information including a measurement gap configuration information element MeasGapConfig to configure a network controlled small gap (NCSG) pattern for the UE if the UE requires an NCSG and the UE is not configured with a primary secondary cell (PSCELL), and means for obtaining one or more measurements on a neighbor cell according to the measurement gap configuration information. Example thirty-nine may include the subject matter of example thirty-eight or any of the examples described herein, wherein the NCSG pattern comprises a single NCSG pattern with a constant repetition period for the UE if no measurement gap is configured among a primary cell and one or more secondary cell subframes. Example forty may include the subject matter of example thirty-eight or any of the examples described herein, wherein the NCSG pattern comprises NCSG Pattern ID #0 on one or more serving carriers where a measurement gap is not configured if Gap Pattern ID #0 is configured for the UE on some but not all serving carriers including a primary component carrier (PCC) and one or more secondary component carriers (SCCs). Example forty-one may include the subject matter of example thirty-eight or any of the examples described herein, wherein the NCSG pattern comprises NCSG pattern ID #1 on one or more serving carriers where a measurement gap is not configured if Gap Pattern ID #1 is configured on some but not all serving carriers including a primary component carrier (PCC) and one or more secondary component carriers (SCCs). Example forty-two may include the subject matter of example thirty-eight or any of the examples described herein, wherein no NCSG pattern is configured if a measurement gap pattern is configured on all serving carriers including a primary component carrier (PCC) and one or more secondary component carriers (SCCs). Example forty-three is directed to machine-readable storage including machine-readable instructions, when executed, to realize an apparatus as recited in any preceding example.

In the description herein and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. It should be noted, however, that "over" may also mean that two or more elements are not in direct contact with each other. For example, "over" may mean that one element is above another element but not contact each other and may have another element or elements in between the two elements. Furthermore, the term "and/or" may mean "and", it may mean "or", it may mean "exclusive-or", it may mean "one", it may mean "some, but not all", it may mean "neither", and/or it may mean "both", although the scope of claimed subject matter is not limited in this respect. In the description herein and/or claims, the terms "comprise" and "include," along with their derivatives, may be used and are intended as synonyms for each other.

Although the claimed subject matter has been described with a certain degree of particularity, it should be recognized that elements thereof may be altered by persons skilled in the art without departing from the spirit and/or scope of claimed subject matter. It is believed that the subject matter pertaining to network controlled small gap configuration and many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:

1. An apparatus of an evolved NodeB (eNB), comprising:
radio frequency (RF) circuitry configured to communicate with a user equipment (UE); and
one or more baseband processors communicatively coupled to the RF circuitry configured to perform operations, comprising:
transmitting measurement gap configuration information including a measurement gap configuration information element MeasGapConfig to configure a network controlled small gap (NCSG) pattern for the UE, wherein the UE requires an NCSG to prevent interruption and the UE is configured with a primary secondary cell (PSCELL), wherein when there is no measurement gap configured among a master cell group (MCG) and a secondary cell group (SCG) subframes, the NCSG pattern comprises a single NCSG pattern with a constant repetition period per serving carrier, wherein the NCSG pattern is based on a visible interruption length before measurement (VIL1) parameter, a measurement length during which there is no gap (ML) parameter, a visible interruption length after measurement (VIL2) and a visible interruption period (VIRP) parameter.

2. The apparatus of claim 1, wherein when gap pattern ID #0 is configured for the UE on the MCG and no measurement gap is configured on the SCG, the NCSG pattern for the SCG is NCSG pattern ID #2.

3. The apparatus of claim 2, wherein NCSG pattern ID #2 comprises a 2 millisecond (ms) VIL1, a 3 ms ML, a 2 ms VIL2 and a 40 ms VIRP.

4. The apparatus of claim 1, wherein when gap pattern ID #1 is configured for the UE on the MCG and no measurement gap is configured on the SCG, the NCSG pattern for the SCG is NCSG pattern ID #3.

5. The apparatus of claim 4, wherein NCSG pattern ID #3 comprises a 2 millisecond (ms) VIL1, a 3 ms ML, a 2 ms VIL2 and a 80 ms VIRP.

6. An apparatus of a user equipment (UE), comprising:
radio frequency (RF) circuitry configured to communicate with a network; and
one or more baseband processors communicatively coupled to the RF circuitry and configured to perform operations comprising:

receiving measurement gap configuration information including a measurement gap configuration information element MeasGapConfig to configure a network controlled small gap (NCSG) pattern for the UE, wherein the UE requires an NCSG and the UE is configured with a primary secondary cell (PSCELL), wherein when there is no measurement gap configured among a master cell group (MCG) and a secondary cell group (SCG) subframes, the NCSG pattern comprises a single NCSG pattern with a constant repetition period per serving carrier, wherein the NCSG pattern is based on a visible interruption length before measurement (VIL1) parameter, a measurement length during which there is no gap (ML) parameter, a visible interruption length after measurement (VIL2) and a visible interruption period (VIRP) parameter.

7. The apparatus of claim 6, wherein when gap pattern ID #0 is configured for the UE on the MCG and no measurement gap is configured on the SCG, the NCSG pattern for the SCG is implicitly configured as NCSG pattern ID #2.

8. The apparatus of claim 7, wherein NCSG pattern ID #2 comprises a 2 millisecond (ms) VIL1, a 3 ms ML, a 2 ms VIL2 and a 40 ms VIRP.

9. The apparatus of claim 6, wherein when gap pattern ID #1 is configured for the UE on the MCG and no measurement gap is configured on the SCG, the NCSG pattern for the SCG is implicitly configured as NCSG pattern ID #3.

10. The apparatus of claim 9, wherein NCSG pattern ID #3 comprises a 2 millisecond (ms) VIL1, a 3 ms ML, a 2 ms VIL2 and a 80 ms VIRP.

11. One or more machine-readable media having instructions stored thereon that, when executed by an evolved NodeB (eNB), result in:

encoding measurement gap configuration information including a measurement gap configuration information element MeasGapConfig to configure a network controlled small gap (NCSG) pattern for a user equipment (UE) device, wherein the UE requires an NCSG and the UE is configured with a primary secondary cell (PSCELL), wherein when there is no measurement gap configured among a master cell group (MCG) and a secondary cell group (SCG) subframes, the NCSG pattern comprises a single NCSG pattern with a constant repetition period per serving carrier, wherein the NCSG pattern is based on a visible interruption length before measurement (VIL1) parameter, a measurement length during which there is no gap (ML) parameter, a visible interruption length after measurement (VIL2) and a visible interruption period (VIRP) parameter; and causing the measurement gap configuration information to be transmitted to the UE in a radio resource control (RRC) connection reconfiguration message.

12. The apparatus of claim 11, wherein when gap pattern ID #0 is configured for the UE on the MCG and no measurement gap is configured on the SCG, the NCSG pattern for the SCG is NCSG pattern ID #2.

13. The apparatus of claim 12, wherein NCSG pattern ID #2 comprises a 2 millisecond (ms) VIL1, a 3 ms ML, a 2 ms VIL2 and a 40 ms VIRP.

14. The apparatus of claim 11, wherein when gap pattern ID #1 is configured for the UE on the MCG and no measurement gap is configured on the SCG, the NCSG pattern for the SCG is NCSG pattern ID #3.

15. The apparatus of claim 14, wherein NCSG pattern ID #3 comprises a 2 millisecond (ms) VIL1, a 3 ms ML, a 2 ms VIL2 and a 80 ms VIRP.

* * * * *